United States Patent
Sanders

(10) Patent No.: US 7,844,152 B2
(45) Date of Patent: Nov. 30, 2010

(54) KERR EFFECT COMPENSATED OPTICAL RING RESONATOR

(75) Inventor: Glen A. Sanders, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 219 days.

(21) Appl. No.: 12/167,219

(22) Filed: Jul. 2, 2008

(65) Prior Publication Data

US 2010/0002283 A1 Jan. 7, 2010

Related U.S. Application Data

(60) Provisional application No. 60/948,341, filed on Jul. 6, 2007.

(51) Int. Cl.
- G02B 6/00 (2006.01)
- H01S 3/08 (2006.01)
- G02F 1/01 (2006.01)
- G01C 19/64 (2006.01)

(52) U.S. Cl. ................. 385/122; 385/125; 372/92; 372/94; 359/279; 356/459

(58) Field of Classification Search ............. 385/14, 385/27, 30, 32, 39, 41, 42, 122, 129, 130, 385/131, 132, 125; 372/50.1, 70, 71, 92, 372/93, 94; 359/333, 334, 346, 347, 348, 359/279; 356/459
See application file for complete search history.

(56) References Cited

U.S. PATENT DOCUMENTS

| | | | |
|---|---|---|---|
| 5,798,853 A | 8/1998 | Watanabe | 359/160 |
| 6,591,047 B2 | 7/2003 | Malomed et al. | 385/122 |
| 7,034,994 B2 | 4/2006 | McNicol | 359/337.5 |
| 7,327,460 B2 * | 2/2008 | Sanders et al. | 356/461 |
| 7,400,798 B2 * | 7/2008 | de Almeida et al. | 385/32 |
| 7,619,743 B2 * | 11/2009 | Digonnet et al. | 356/460 |
| 2002/0136514 A1 * | 9/2002 | Malomed et al. | 385/122 |
| 2003/0123780 A1 * | 7/2003 | Fischer | 385/15 |
| 2005/0012983 A1 * | 1/2005 | Parolari et al. | 359/326 |
| 2010/0002283 A1 * | 1/2010 | Sanders | 359/279 |

* cited by examiner

*Primary Examiner*—Brian M Healy
(74) *Attorney, Agent, or Firm*—Fogg & Powers LLC

(57) ABSTRACT

Systems and methods for compensating for nonlinear phase shift accumulation in an optical ring resonator. An example method includes sending a first beam in a clockwise direction around the optical ring resonator and sending a second beam in a counterclockwise direction around the optical ring resonator. Then, nonlinear phase shift accumulation of the first and second beams is compensated for within the optical ring resonator. Compensating includes creating a negative Kerr effect phase shift for each beam based on an estimate of accumulated positive Kerr effect.

18 Claims, 3 Drawing Sheets

KERR EFFECT COMPENSATED OPTICAL RING RESONATOR

PRIORITY CLAIM

This application claims the benefit of U.S. Provisional Application Ser. No. 60/948,341 filed Jul. 6, 2007, the contents of which are hereby incorporated by reference.

BACKGROUND

A physical factor that is known to limit the accuracy in a fiber optical resonator gyroscope (FOG) is non-linear Kerr effect. This nonlinear effect, that is a nonlinear phase shift dependent on the intensities of the clockwise (cw) and counterclockwise light waves propagating in the resonator, is accumulated by the two light signals while being transmitted via an optic fiber. This effect, generated by the Kerr effect in silica glass, can produce a large round-trip phase difference between the two waves, and therefore an erroneous indication of rotation rate in the fiber optical resonator gyro.

The non-linear Kerr effect, for a light wave propagating in a single direction, gives an effective index of refraction coefficient of a material that changes with the $$n = n_0 + K|E|^2 \quad (1)$$

where K is a constant of proportionality containing the Kerr coefficient of the medium, E is electric field intensity.

In a fiber optical resonator gyro, since light is traveling in both directions, the propagation constants $\beta_1$ and $\beta_2$ experienced by the clockwise (cw) and counterclockwise (ccw) propagating lightwaves, respectively, at a point z along the fiber length can be expressed as:

$$\beta_1 = \beta_0 + \Delta\beta[I_1(z) + 2I_2(z)], \quad (2)$$

$$\beta_2 = \beta_0 + \Delta\beta[2I_1(z) + I_2(z)], \quad (3)$$

where the above assumes the two lightwaves are linearly-polarized along the axis. Here $\beta_0$ is the propagation constant common to both waves (related to $n_o$ via $\beta_0 = 2\pi n_o/\lambda$, where $\lambda$ is the free space light wavelength) and where $\Delta\beta$ is the constant of proportionality of the change in the propagation constant related to the optical power in the fiber and contains the Kerr coefficient of the material. Note that the propagation constants in the two directions are different if the intensity of the clockwise wave, $I_1(z) = U_1 {}^* U_1$ and the intensities of the counterclockwise wave $I_2(z) = U_2 {}^* U_2$ are different. Here $U_1$ and $U_2$ represent the electric fields of the lightwaves at a single frequency of light. In this case, this means that a difference in phase shift (non-reciprocal phase shift) will be accumulated between cw and ccw waves in a stretch of medium propagation through a segment of the medium with an intensity difference. In the fiber optic resonator gyroscope, unequal intensities in the resonator in the cw and ccw directions give a non-reciprocal round trip phase shift, and therefore a resonant frequency difference, that erroneously indicates the presence of rotation rate. In other words, the erroneous rotation rate is due to an accumulation of phase shifts by cw and ccw waves and a phase shift between cw and ccw waves due to the Kerr Effect, or a non-linear phase shift accumulation in the closed path of the optical resonator.

SUMMARY OF THE INVENTION

The present invention provides systems and methods for compensating for nonlinear phase shift accumulation in an optical ring resonator. An example method includes sending a first beam in a clockwise direction around the optical ring resonator and sending a second beam in a counterclockwise direction around the optical ring resonator. Then, nonlinear phase shift accumulation of the first and second beams is compensated for within the optical ring resonator. Compensating includes creating a negative Kerr effect for each beam or reversing the sign of the nonlinear phase shift accumulation such that the net total non-linear phase shift accumulation is very sharply reduced or eliminated. The optical compensation may be based on an estimate of accumulated positive Kerr effect through one segment of the fiber.

Compensating is performed by a compensating device, suggested by Malomed et al. in U.S. Pat. No. 6,591,047 for communication systems, such as a second harmonic generating (SHG) optical crystal, a second harmonic generating (SHG) polymer fiber, and a semiconductor waveguide The compensating device may also be a phase conjugating element (PCE).

In some cases, the compensating device conveys the beams along a multi-segment trajectory in the compensating device.

BRIEF DESCRIPTION OF THE DRAWINGS

Preferred and alternative embodiments of the present invention are described in detail below with reference to the following drawings:

FIGS. 1-2 and 1-3 illustrate alternate resonator configurations in accordance with embodiments of the present invention;

FIG. 1-4 illustrates a portion of the resonators shown in FIGS. 1-1 thru 1-3; and FIGS. 2 thru 4 illustrate various embodiments of compensating devices used in the systems shown in FIGS. 1-1 thru 1-3.

DETAILED DESCRIPTION OF THE PREFERRED EMBODIMENT

Figure 1:
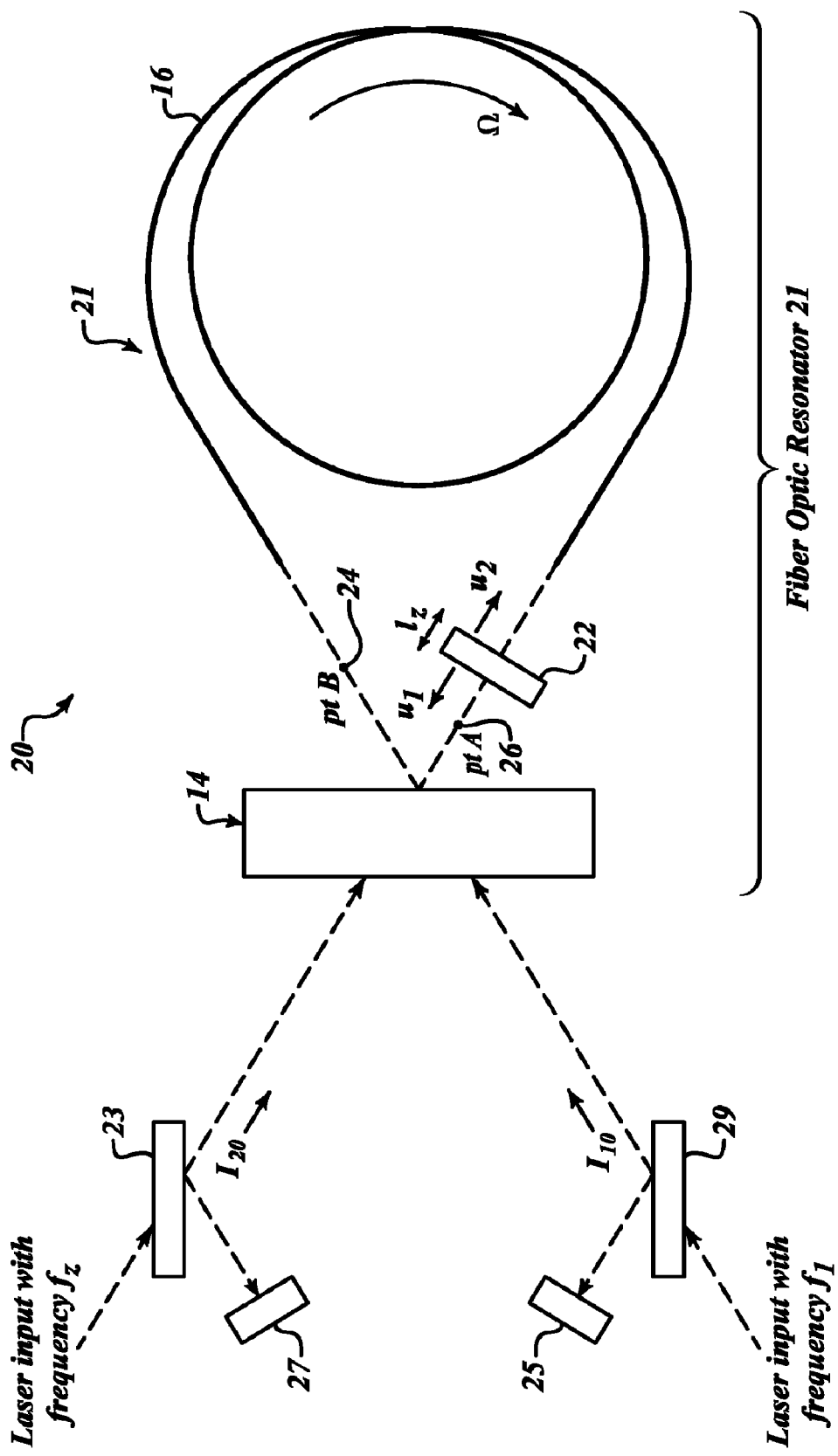
FIG. 1-1 illustrates an example fiber optic resonator system formed in accordance with the present invention.

The present invention provides methods and systems for compensation of a regular positive nonlinearity in a fiber optical resonator gyroscope by introducing in the resonator one or more compensating devices capable of producing an effectively-negative nonlinearity or a reversal of the non-linear phase shift for an optical signal passing there-through. Another possibility is the deployment of phase conjugation using a non-linear element to compensate the non-linearity.

Examples of the above-mentioned effectively-negative compensating devices can be found in the following non-exhaustive list comprising: a nonlinear optical crystal, a poled polymer fiber, and a semiconductor wave guide.

The non-linear optical crystals (for example, the presently available potassium titanyl phosphate (KTP), potassium dihydrogen phosphate (KDP), barium borate optical crystals (BBO) or the like) are capable of receiving a light beam having a fundamental harmonic and producing there-inside at least one higher-order harmonic light beam. For the sake of simplicity and in the frame of the present description, these crystals will be called Second Harmonic Generation crystals, or SHG crystals.

It is known that polymer fibers, if subjected to uniform poling, acquire the property similar to that of the above-mentioned crystals, i.e., the capability of producing a second harmonic when conducting a fundamental harmonic light beam.

Both in the nonlinear crystals, and in the polymer fibers the property of SGH (second harmonic generation) is capable of inducing a negative sign of the nonlinearity produced by the device.

The semiconductor waveguides at particular conditions (when the carrier frequency of the light signal is close to the half-band of the semiconductor material) also may produce the negative nonlinearity, though this effect is based on different physical principles.

The physical effect of producing a second harmonic in the non-linear (SHG) crystal can be described by a system of two differential equations:

$$i\frac{dU}{dz} + U*V = 0 \quad (2)$$
$$2i\frac{dV}{dz} + \frac{1}{2}U^2 - q*V = 0$$

where: U(z) is a fundamental (first) harmonic of the light signal, V(z) is a second harmonic of the light signal produced in the crystal, z—is the propagation distance for the light signal, q—is a mismatch coefficient or phase velocity mismatch parameter, depending on the wavelength of the optical signal i—is the square root of (−1).

It is also known that the nonlinear phase shift Δϕ of the light beam at a fundamental harmonic emerging from the crystal is proportional to the following product:

$$\Delta\phi = K_{eff}|U|^2 \quad (3)$$

where $K_{eff}$ is the effective Kerr coefficient achieved in the crystal.

Further, a very large value of the effective Kerr coefficient ($K_{eff}$) can be generated via a cascading mechanism in the second-harmonic-generating optical crystals [C. Etrich, F. Lederer, B. A. Malomed, Thomas Peschel, U. Peschel. Optical Solitons in Media with a Quadratic nonlinearity. E. Wolf. Progress in optics 41©2000 Elsevier Science B.V.].

The cascading mechanism is described, for example in [G. I. Stegeman, D. J. Hagan, and L. Torner, Optical and Quantum Electronics., vol. 28, p. 1691-1740 (1996)].

Namely, it has been noticed that the value of $K_{eff}$ in the non-linear (SHG) crystals is much more than the natural Kerr coefficient of the crystal, and is estimated as:

$$K_{eff} = \pm 10^{+4} * K, \quad (4)$$

where K is the intrinsic Kerr coefficient.

The most important fact is that the gigantic Kerr coefficient $K_{eff}$ induced by the cascading mechanism may have either a positive or negative sign. As can be seen from the system of equations (2), it can be readily controlled by means of the phase velocity mismatch parameter q. There are some scientific articles which theoretically investigate such a phenomenon [O. Bang, C. B. Clausen, P. I. Christiansen, Lluis Torner Engineering competing nonlinearities. Optics Letters, Oct. 15, 1999, Vol. 24, No. 20].

In turn, the mismatch parameter can be conveniently controlled by means of a quasi-phase matching technique, i.e., by a periodic inversion of orientation of domains inside the second-harmonic-generating optical crystal periodic poling.

The sign of the cascading-induced effective Kerr coefficient ($K_{eff}$) may be made negative to produce the negative formal Kerr effect, and be used for compensating the ordinary positive Kerr effect accumulated in long fiber spans.

The above-mentioned estimate that the effective Kerr coefficient ($K_{eff}$) induced by the cascading mechanism may exceed the intrinsic Kerr coefficient K by four orders of magnitude. This implies that, for a 50 km long fiber span, such as used in optical communications, the necessary compensating optical path in the second-harmonic-generating crystal must be approximately 5 m. This obviously poses a problem as the actual size of the presently available crystal samples (those of the cubic form) are limited to about 5 cm. However, for a short length of fiber as formed in a fiber optic ring resonator gyro, using say 500 m, this becomes a possibility since a 5 cm long crystal may be used. Even further in favor of using this technique in a fiber optic ring resonator is the fact that hollow core fibers may be used, with much less positive Kerr effect needed to be compensated than for conventional solid glass fibers. The positive Kerr effect may, for example, be reduced by 100× in the hollow core fiber, thus the requirement on either the length of the crystal or the need for four orders of magnitude enhancement factor as shown in equation (4) may be relaxed proportionately with the lesser value (~100×) of the Kerr effect to be compensated for in the fiber by using hollow core fibers. Hollow core fibers conduct and guide light via the optical bandgap effect, rather than by index-guiding as is known in conventional solid core fibers.

The nonlinearity compensating devices of various sizes and efficiencies may be developed also on the basis of the polymer fibers and semiconductor waveguides.

Looking again at crystal technology, one way of enhancing its capacity to offset positive Kerr phase shifts consistent with presently available actual sizes of the crystals having the cubic form is by covering two opposite facets of the cubic sample by mirror surfaces. In this way, it is possible to arrange a multi-path transmission of the optical beam through the crystal thus increasing the pathlength through the crystal.

To make the nonlinearity compensator most efficient and economical, it should be integrated with an amplifier. Preferably, the second-harmonic-generating crystal must be placed immediately after the amplifier, to maximize the nonlinear effect provided by the nonlinearity compensator.

The compensator as above can form a self-containing unit insertable to a suitable point in the fiber optical resonator gyro.

The drawings that are referred to below illustrate the most preferred embodiment of the invention according to which the compensating device comprises a nonlinear optical crystal also called second harmonic generating (SHG) optical crystal.

As shown in FIG. 1-1, a system 20, such as a sensor, includes an optical resonator 21 consisting of an optical fiber coil 16 of length L, and optical non-linear crystal 22 of length l a recirculating device 14 (e.g. a partially transmitting mirror) and possibly focusing optics (not shown) that focus or collimate light emerging from the fiber into free space. Light emerging from the fiber coil, in say the ccw direction is directed to the non-linear crystal and the recirculating device before it re-enters the fiber coil, thus forming a closed resonator path. Likewise light also propagates in the cw direction by emerging from the fiber coil, reflecting from the recirculating device, passing through the crystal 22 and is directed back into the coil. In the presence of rotation rate Ω, the resonance frequencies in the cw and ccw are split, indicative of rotation. In order to measure the ccw and cw resonance frequencies, external laser lightwaves at frequencies f2 and f1 respectively are directed into the resonator 21 through the partially transmitting recirculating device 14. Lightwaves emanate from the resonator in the cw and ccw directions through the partially transmitting recirculating device 14 and are directed to detectors 27 and 25 respectively via beamsplitters 23 and 29 respectively. The resonance centers are determined by adjusting each laser frequency to the center of a resonance dip seen at each detector. The indicated rotation rate is proportional to the laser frequency difference after both laser frequencies are tuned to the center of the resonances. Another implementation can also be used, in which two or more recirculating devices in the resonator are employed, as known in the literature as a transmitting ring resonator, can also be employed, in which the centers of the resonances are peaks in the lineshape.

Referring to FIG. 1-1 the cw wave passing through crystal 22 has a fundamental harmonic $U_1$ and the ccw wave passing in the opposite direction has a fundamental component $U_2$ in the opposite direction. Assuming, for simplicity, the non-linear phase shift at the fundamental the segment of the resonator 21 occupied by the coil 16 and the crystal 22 is given by:

$$\Delta\phi_1 = \Delta\beta L[I_1(z)+2I_2(z)] + \Delta\beta_{eff} l[I_1(z)+2I_2(z)] \quad (5)$$

in the clockwise direction, and $$\Delta\phi_2 = \Delta\beta_{eff} l[I_2(z)+2I_1(z)] + \Delta\beta L[I_2(z)+2I_1(z)] \quad (6)$$

in the counterclockwise direction.

Thus, if $\Delta\beta_{eff} l = -\Delta\beta L$ then $\Delta\phi_2 = \Delta\phi_1$, regardless of whether $I_2(z) = I_1(z)$ or not. In this case, there is no rotation error, as desired. The above illustration was for the case in which the fiber and crystal were lossless and therefore the order of propagation through them was equivalent. In a more general case, the $\Delta\phi_2 = \Delta\phi_1$ condition may be satisfied by making $r\Delta\beta_{eff} l = -\Delta\beta L$ where r is a factor that is adjusted to account for fact that the difference between $I_1$ and $I_2$ is different in the coil versus the crystal. Another method is to put two crystals, each of which compensate half the Kerr effect in the coil, at points A 26 and B 24 on either side of the coil. In this way, each beam experiences a transit through a crystal, then the fiber, then the other crystal. Using this symmetry one can account for differences in loss in the two directions associated with FIG. 1-1 (coil-crystal transit vs crystal-coil transit).

Figures 1, 2:
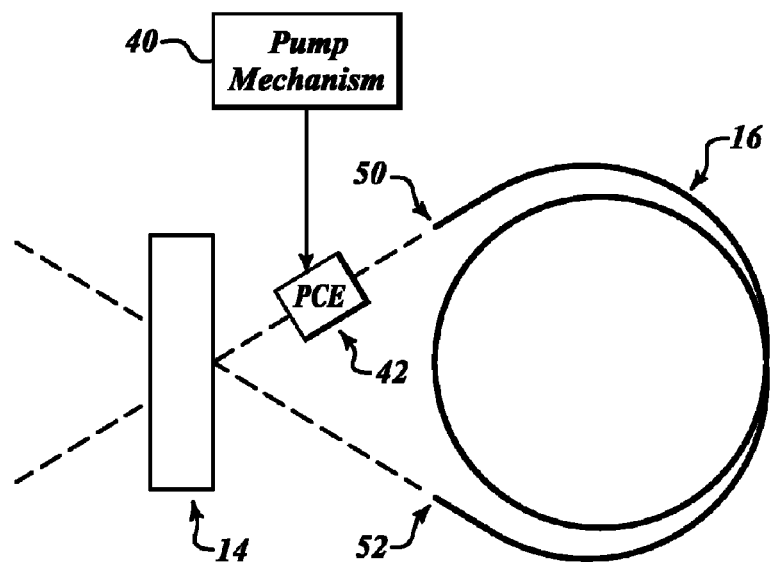
Figures 1, 2, 3:
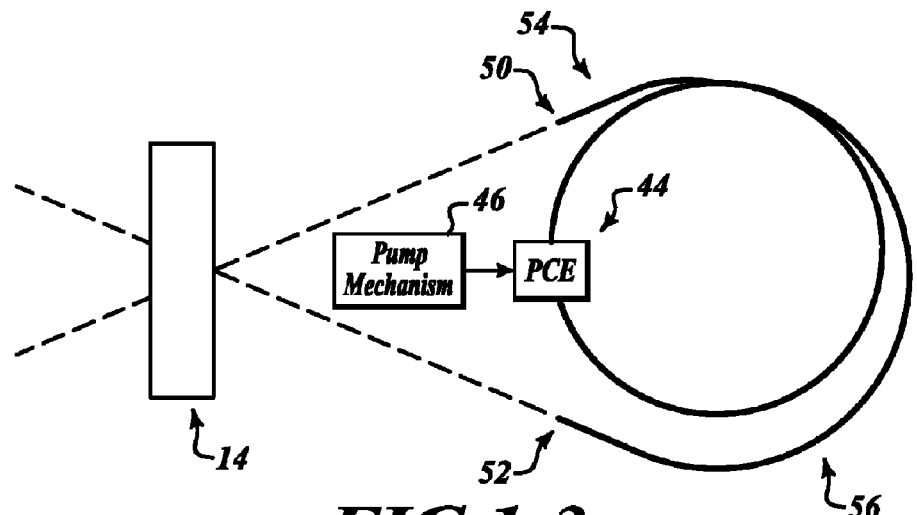

Two other methods of compensating for the Kerr effect non-linearity, shown in FIGS. 1-2 and 1-3, use optical phase conjugation, which is explained in FIG. 1-4. In FIG. 1-4, a phase conjugate element 60, optically pumped by pump assembly 62, is placed between two lengths of fiber 66 and 64, which have approximately the same lengths $l_1$ and $l_2$. Signal light 72 at frequency f is introduced to the first fiber 66 where it accumulates a phase shift $\Delta\Phi$ due to the Kerr effect prior to being directed through phase conjugate element 60 which is optically pumped by pump assembly 62. The light wave is then injected into second fiber 64 where a non-linear phase shift $-\Delta\Phi$ due to propagation in the second fiber. The net effect is to produce a net non-linear phase shift that is zero or greatly attenuated from $\Delta\Phi$.

A phase conjugate element (PCE) 42 may be placed inside the resonator as shown FIG. 1-2 (where the elements to the left of recirculating device 14 are exactly the same as in FIG. 1-1, although not shown in FIG. 1-2). In this case light traveling cw for instance entering the fiber coil 16 at fiber tip 50 traverses the fiber and builds up a non-linear phase shift $\Delta\Phi$ due to the Kerr effect, and emerges from a second fiber tip 52 before being directed to the recirculating device 14 and passing through the PCE 42, which is optically pumped by a pump assembly 40. After traversing the PCE 42 the light is redirected into the fiber coil 16 at fiber tip 50. During the second traversal of the coil the light accumulates a non-linear phase shift of $-\Delta\Phi$ due to the Kerr effect, thus canceling the effect seen in the first pass through the fiber. Thus, alternating passes cancel the Kerr effect, greatly attenuating errors. This is also true in the opposite direction for light propagation.

FIG. 1-3 shows an alternative design in which the Kerr phase shift cancellation occurs every round-trip pass around the resonator. In this instance, the coil is split into to lengths of fiber 54 and 56, each of which are each arranged in a coil to be sensitive to rotation rate. A PCE 44 which is optically pumped by pump assembly 46 is placed at roughly the coil mid-point. Light traveling, cw in the fiber 54 accumulates non-linear phase shift $\Delta\Phi$ due to the Kerr effect, passes through the PCE 44 and enters the fiber 56. In the fiber 56 the lightwave accumulates a non-linear phase shift $-\Delta\Phi$ due to the Kerr effect before being incident on the recirculating device 14 and reflected back into the fiber 54, thus completing a round-trip in the resonator. In this way, the phase shift due to the non-linear Kerr effect is eliminated or strongly reduced every round trip within the resonator. This arrangement is used to eliminate or reduce this phase shift in both directions of light propagation, and thus reduces non-reciprocal phase shifts and errors that would otherwise exist in the gyro.

As shown in FIG. 2, the crystal 22 includes an optical axis "z". The crystal produces an output fundamental harmonic U' signal and also an output second harmonic signal V. The fundamental harmonic signal U' is obtained from the crystal 22 due to the cascading effect and is always characterized by a particular sign of the cascading-induced effective Kerr coefficient.

The procedure of checking the sign of the Kerr effect of the crystal 22 is performed in advance, when manufacturing the crystal. If the sign of the effective Kerr coefficient does not suit the purpose, it is controlled by affecting the q-coefficient by periodical poling of the crystal domains. Eventually, the value of the effective Kerr coefficient can be adjusted by the mentioned procedure. After ensuring that the effective Kerr coefficient corresponds to a negative formal Kerr effect, the value of the negative Kerr coefficient is adjusted specifically to the optical resonator being used. It can be done, for example, by determining the distance of the fiber of the resonator 21. Preferably, the crystal is placed immediately after an optical signal amplifier.

FIG. 3 schematically shows a cross-section of one embodiment of an optical crystal 130 adapted for compensating nonlinear effects (used in place of the crystal 22). The optical crystal 130 is a KTP or BBO nonlinear crystal of a cubic form, which is coated by a reflecting surface 132 at two of its opposite facets. As known in the art per se, there are also other ways of achieving such reflecting surfaces and the products of such methods are encompassed in the present invention. The crystal 130 includes one input opening 134 in the reflecting surface, via which the incoming optical signal, with the accumulated positive Kerr effect or just more positive than the optical signal travelling in the opposite direction (CW or CCW) and having the fundamental harmonic U, enters the crystal 130. The crystal 130 is preliminarily controlled to adjust the sign and value of the effective Kerr coefficient produced by it. In the crystal 130, owing to the reflecting surfaces, the light beam is forced to perform a multi-path trajectory 135 for extending the optical path and comes out via an output window 136 as a modified signal U'. In the signal U', the earlier accumulated positive Kerr effect is compensated with the negative Kerr effect created by the crystal. The trajectory can be made sufficiently long to provide for the value of the effective Kerr coefficient required for compensating the accumulated positive Kerr effect. The accumulated compensating phase shift is directly proportional to the length of the total optical path via the crystal 130. The total trajectory length, in turn, can be regulated by the incidence angle of the beam.

For calculation of the extended optical path, the system of equations (2) can be used and boundary conditions of reflection should be considered for taking into regard the phase shift appearing at the points of the beam reflection from the mirror surfaces. The crystal 130 can be placed in a container or optical resonator package, and the windows 134 and 136 can be provided with collimating lenses for focusing and adjusting the light beam.

Figures 1, 2, 3, 4:
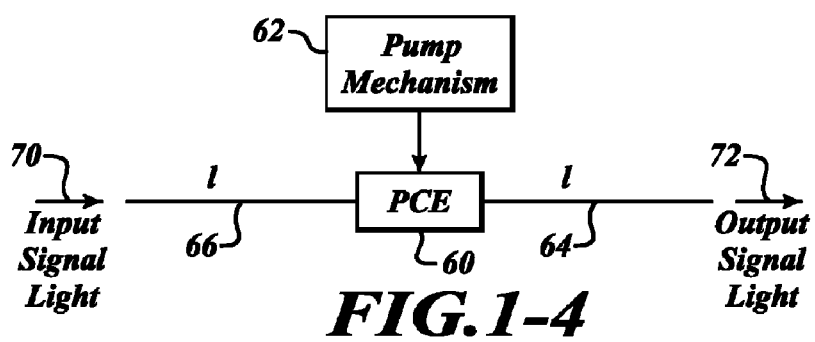
Figure 2:
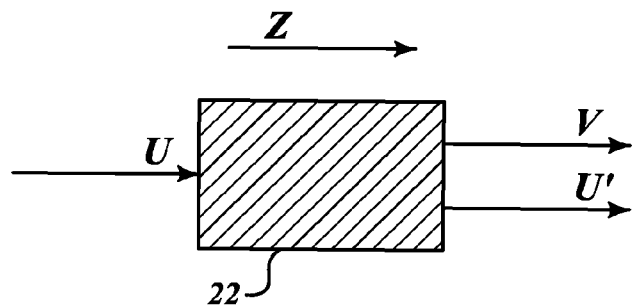
Figure 3:
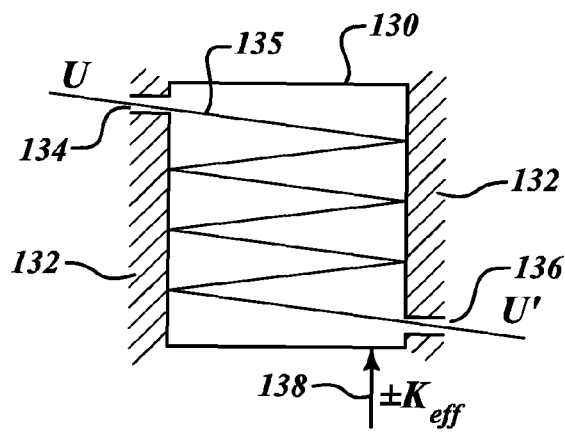
Figure 4:
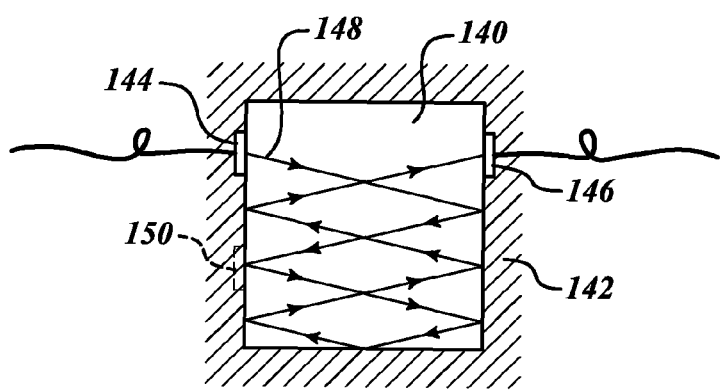

FIG. 4 shows a non-linear optical crystal 140 (shown in a cross section) that is completely coated by a reflecting surface 142. Openings 144 and 146 in the mirror surface are provided with adjustable collimating lenses (schematically shown as boxes). Owing to the additional reflecting surface at the bottom facet of the crystal 140, the optical path of a beam 148 in the crystal 140 can be twice as long in comparison with that shown in FIG. 3 (if the crystals are similar). Moreover, one or more optional windows 150 can be provided on the surfaces of the crystal 140. The trajectory length can be thus regulated by selecting a particular incidence angle and a particular pair of the windows between which the beam should be passed. Such a device may serve as a variable nonlinearity compensator.

In summary the length and effective Kerr Coefficient of a non-linear compensating medium (NLCM) are selected such that the Kerr induced non reciprocal phase shift in the NLCM is equal and opposite to that of the optical fiber, thus making the whole optical loop insensitive to small mismatches of power in the CW and CCW waves traveling around the resonator 21. In this way, optical Kerr effect is attenuated in an optical fiber resonator gyro, above and beyond that achieved with just a hollow core resonator.

While the preferred embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for compensating for nonlinear phase shift accumulation in an optical ring resonator, the method comprising:
    sending a first beam at a first frequency in a clockwise direction around the optical ring resonator;
    sending a second beam at a second frequency in a counterclockwise direction around the optical ring resonator; and
    optically compensating for nonlinear phase shift accumulation of the first and second beams in the optical ring resonator.

2. The method of claim 1, wherein the optical ring resonator includes hollow core fiber.

3. The method of claim 1, wherein compensating comprises:
    creating a negative Kerr effect phase shift for each beam based on an estimate of accumulated positive Kerr effect.

4. The method of claim 3, wherein compensating is performed by a compensating device.

5. The method of claim 4, wherein the compensating device comprises at least one of a second harmonic generating (SHG) optical crystal, a second harmonic generating (SHG) polymer fiber, and a semiconductor waveguide.

6. The method of claim 5, wherein compensating comprises conveying the beams along a multi-segment trajectory in the compensating device.

7. The method of claim 1, wherein compensating comprises:
    using a phase conjugate element to reverse the non-linear optical phase shift accumulated in traversal of a fiber length thus giving a substantially reduced net non-linear phase shift in the optical ring resonator.

8. A system for compensating nonlinear phase shift accumulation in an optical ring resonator, the system comprising:
    a means for sending a first beam at a first frequency in a clockwise direction around the optical ring resonator;
    a means for sending a second beam at a second frequency in a counterclockwise direction around the optical ring resonator; and
    a means for optically compensating for nonlinear phase shift accumulation of the first and second beams in the optical ring resonator.

9. The system of claim 8, wherein the optical ring resonator includes hollow core fiber.

10. The system of claim 8, wherein the means for compensating further comprises creating a negative Kerr effect phase shift for each beam based on an estimate of accumulated positive Kerr effect.

11. The system of claim 10, wherein the means for compensating comprises at least one of a second harmonic generating (SHG) optical crystal, a second harmonic generating (SHG) polymer fiber, and a semiconductor waveguide.

12. The system of claim 11, wherein the means for compensating conveys the beams along a multi-segment trajectory.

13. The system of claim 8, wherein the means for compensating comprises:
    a phase conjugate element configured to reverse the non-linear optical phase shift accumulated in traversal of a fiber length thus giving a substantially reduced net non-linear phase shift in the optical ring resonator.

14. A system comprising:
    an optical ring resonator comprising a reflector device and a fiber optic coil;
    a first light source configured to generate a first optical beam;
    a second light source configured to generate a second optical beam;
    one or more optical components configured to direct the first and second optical beams into the optical ring resonator, the first beam being directed in a clockwise direction around the optical ring resonator and the second beam being directed in a counterclockwise direction around the optical ring resonator; and
    a nonlinear phase shift accumulation compensating device located within the optical ring resonator, the nonlinear accumulation compensating device configured to optically compensate for nonlinear phase shift accumulation of the first and second beams.

15. The system of claim 14, wherein the fiber optic coil includes at least one hollow core fiber.

16. The system of claim 14, wherein the nonlinear accumulation compensating device is further configured to create a negative Kerr effect phase shift for each beam based on an estimate of accumulated positive Kerr effect.

17. The system of claim 16, wherein the compensating device comprises at least one of a second harmonic generating (SHG) optical crystal, a second harmonic generating (SHG) polymer fiber, and a semiconductor waveguide.

18. The system of claim 17, wherein the compensating device conveys the beams along a multi-segment trajectory.

* * * * *